UNITED STATES PATENT OFFICE.

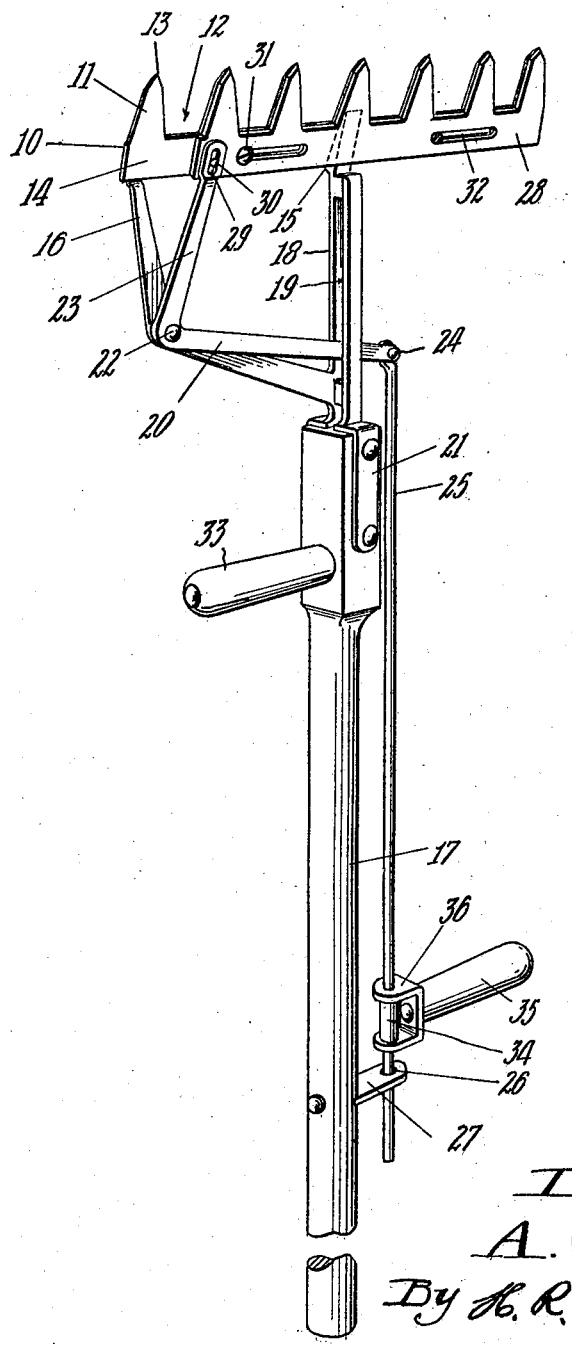

AMBROSE CAESAR, OF MOSMAN, NEAR SYDNEY, NEW SOUTH WALES, AUSTRALIA.

HAND CLIPPER-MOWER.

1,398,672.	Specification of Letters Patent.	Patented Nov. 29, 1921.

Application filed September 17, 1920. Serial No. 410,883.

*To all whom it may concern:*

Be it known that I, AMBROSE CAESAR, of "La Hejmo," Ourimbah Road, Mosman, near Sydney, New South Wales, Australia, subject of the King of Great Britain and Ireland, have invented certain new and useful Improvements in Hand Clipper-Mowers, of which the following is a specification.

This invention relates to a novel structure constituting a manually operated gardener's implement for clipping or mowing hedges and for trimming shrubs and trees.

Its object is to minimize labor and time in hedge, tree, and shrub clipping operations, which are usually performed by means of hand shears, and to facilitate even and neat clipping.

The implement consists of a flat comb plate armed with teeth and having wide spaces intervening said teeth, a toothed cutter plate of corresponding shape mounted in operative contact with said comb plate and capable of reciprocatory movement across the same to procure a scissor action between the respective teeth of the comb and the cutter, a long haft carrying the comb plate transversely at one end of it, said haft supporting holding and cutter actuating means, and being rearwardly extended and so adapted to be held under one arm of the operator, a fixed holding handle on the forward part of the haft, an operating handle mounted so as to be laterally free, and rod, link, and bell crank mechanism between said operating handle and said cutter plate, said mechanism adapted to transmit reciprocating movement therefrom to said cutter plate.

The accompanying drawing shows the implement in perspective view.

The comb plate 10 is a flat plate of shear steel, having formed integrally on it a symmetrically disposed row of stub teeth or blades 11 with intervening gaps 12 approximating in width to the breadth of the teeth 11 at the root thereof. The cutting edges of the teeth 11 are of straight line form with the tops finished to bluff points at the ends 13. It is not essential that the cutting edges should be straight, they may be more or less curved, but the straight finish is preferred; the angle of the cutting faces of the comb teeth, which corresponds with the angle of the cutting faces of the cutter teeth hereinafter described, should be about 10°, so that when in cutting operation the opposed teeth will include a cutting angle of about 20° more or less. The body portion 14 of the comb plate 10 is welded or secured by bolts or rivets to the carrier claw 15 and to the bracket arm 16, with the plane of the blade disposed at an angle of 15° more or less to the length of the haft 17. The frame extension member 18 is slotted as indicated at 19 to form a guide for the power arm 20 of a bell crank. The bell crank is fulcrumed on a pivot 22 which is mounted on the bracket arm 16, and the power end 20 of the bell crank which projects through the guide slot 19 is pivotally connected at 24 to the forward end of the operating rod 25. The rear part of the rod 25 is a free working fit in a guide hole 26 in a lug 27 which is fixed to the haft 17 at a point about 30 inches more or less from the comb plate 10. The work arm 23 of the bell crank is connected to the cutter plate 28 by a stud pin 30 fixed therein working in a slotted hole 29 in the end of the bell crank arm 23. The comb and cutter plates are maintained in sliding contact by adjustable tension bolts or screws 31 which may be fitted with spring washers (not shown), the cutter plate being slotted as shown at 32 to provide clearance for the bolts 31, which are non-rotatably fixed in the comb plate after adjustment of tension by any appropriate device sufficient for so fixing them. Rearward of the carrier member 18 a fixed holding handle 33 is fitted, laterally offset from the haft 17 in the same plane as the extension bracket 16. 34 is a collar fixed to the operating rod 25. An operating handle 35 is fitted with a stub 36 which is rotatably carried on the rod 25, but is held against longitudinal movement thereon by the fixed collar 34. In use, the cutter plates should be lubricated with a lubricating substance having a cleaning quality adapted to prevent gumming up of the cutter plate and comb plate.

The structure is such that extreme lightness is obtained. This is an essential condition of practical utility, as if the dead weight of the implement were such as to tire the user unreasonably the advantages obtained would be offset. When the weight of the implement is kept at a minimum and it is used in the manner hereinafter described, the physical labor of holding it up to its work and operating it is not likely to prove tiresome, so that in practice the implement can be used for an extended period of time.

In operation, assuming the user to be a right hand person, the implement is held with the haft 17 under the left arm of the user, the length of the haft being ample for this purpose, and the fixed handle 33 is held in the left hand, which is extended toward the work. The angular position of presentation of the comb may be thus disposed in any required plane to clip or trim a hedge, shrub, or tree. Cutting is effected by reciprocating the handle 35 by means of the right hand of the user; the operating rod 25 is thus reciprocated. Its motion is transmitted through the bell crank 20—23 to the cutter plate, the cutter plate being thus caused to reciprocate on the comb plate, and to shear leaves, twigs, and light branches to a neat clean face. Practical test has proved that a workman can, with great facility, cover a considerably greater area of surface with this implement than is possible with any hand clipping instrument of the shears type, and with better assurance that the work will be finished cleanly and to correct line. The swing handle, being free to turn laterally upon the operating rod 25, accommodates itself to a comfortable working position for the user's right hand when the angular position of the comb plate is altered to set the direction of the cut, so that the implement can be used with equal facility with the comb plate presented to the work in either vertical, or horizontal position, or in any angular direction.

What I claim as my invention and desire to secure by Letters Patent is:—

1. In a hedge clipper, a haft having a head, a comb fixed transversely on the head of the haft, a cutter coacting with said comb and adapted to be reciprocated on said comb, a rod slidably carried on said haft in alinement therewith for reciprocating the cutter, a bell crank connecting said rod and cutter, and a hand grip on said rod immovable along said rod but rotatably mounted thereon to accommodate it to the operator's hand position irrespectively of the working position of the clipper.

2. A hedge clipper of the type in which a tooth cutter is caused to be reciprocated upon a toothed comb by manually reciprocating a hand grip, while the implement is held by a long haft having a fixed hand grip thereon, including means for mounting the reciprocating hand grip on the reciprocating elements so that it may be swung transversely of the implement irrespectively of the reciprocating movement.

3. In a hedge clipper of the type herein described, an elongated haft, a comb, a cutter associated with the comb, a forked bracket having a slotted stem fixed at its base on the end of the haft, a slotted guide in one arm of said forked bracket, a fulcrum pin on the other arm of said forked bracket, attachments for the comb on the bracket ends, a bell crank connected to the cutter at one end thereof and fulcrumed on said pin, and a manually reciprocable element connected with the other end of the bell crank.

In testimony whereof I affix my signature.

AMBROSE CAESAR.